3,030,241
GALVANIZING FLUX COMPOSITION AND TREATMENT
Frederick C. Brightly, Jr., 720 Belleforte Ave., Oak Park, Ill.
No Drawing. Filed Feb. 24, 1959, Ser. No. 794,809
6 Claims. (Cl. 148—23)

The present invention relates broadly to the galvanizing art, and is more particularly concerned with a novel galvanizing flux composition and the treatment of existing flux blankets to markedly reduce and essentially eliminate metal spatter, fumes and related problems associated with iron galvanizing.

First, a large percentage of the volume of galvanizing work is performed utilizing kettles or tanks wherein the molten zinc is covered with a blanket of melted sal-ammoniac or melted zinc ammonium chloride through which the workpiece passes prior to contact with the molten metal. The flux continuously smokes or gives off vapors containing a relatively high concentration of ammonia, and this is a source of constant irritation to persons in the work area, and in many cases induces nausea. Further, the water of crystallization in the flux is evaporated from the salt by the hot zinc and after a time becomes relatively thick, pasty, gummy and chemically inert. And even before the flux reaches this deadened or inert condition, the loss or reduction of its water of crystallization causes it to adhere to the workpiece and results in rejections.

The procedure most frequently followed to avoid this condition is to rejuvenate or revitalize the flux blanket by adding thereto a quantity of flux material just prior to lowering or passing items to be galvanized into the kettle or tank. The new flux is stirred or mixed with the generally dissipated material, and in this way the water of crystallization of the fresh and new material is divided into or blended with the spent flux and the entire blanket is reactivated. As is appreciated, this procedure requires the use of added quantities of chemicals, consumes substantial time during which production cannot continue, and in no manner provides a solution to the smoke and spatter problem, nor does it produce a finished product on which the galvanizing coat is of the quality frequently desired.

Second, spattering of the molten zinc from the galvanizing bath frequently occurs when the workpiece is introduced into the galvanizing kettle through the sal-ammoniac flux blanket thereon. Such spattering is probably the most frequent source of burn injuries to workmen in the galvanizing area. Further, zinc ammonium chloride and sal-ammoniac have a burning or smarting effect upon the human skin, and if these materials are allowed to dry into the skin, serious burn injuries often result therefrom. In addition, and largely by reason of the frequent replacement required of the pre-dip flux materials and the sal-ammoniac or zinc ammonium chloride flux blanket on the molten zinc, the cost of the conventional fluxing operations is rather substantial. Then too, the use of present fluxing compounds and the procedures used therewith are not productive of a galvanized coating which has the desired smoothness, brightness and uniformity.

It is accordingly a primary aim of the present invention to provide a galvanizing flux composition which essentially completely eliminates the molten zinc spattering problem and which further suppresses the undesirable fuming associated with the present galvanizing techniques.

Another object of this invention lies in the provision of a method of treating existing flux blankets to reactivate or revitalize the same, effecting at the same time a suppression of smoke and ammonia fumes and the production of a superior zinc coating upon the workpiece.

Another object of the invention is to provide a flux concentrate which may be shipped in liquid form and requires a lesser weight of material to provide a particular quantity of working flux, which is characterized by ease of handling prior to and during the flux mixing operation, and which upon dilution with water is essentially instantly at the proper operating specific gravity.

A further object of this invention lies in the provision of a method of treating a molten flux blanket covering the surface of a molten zinc path which comprises applying thereto a water solution of an ester-type non-ionic surface active agent and a quaternary ammonium salt.

A still further object of the present invention is to provide a flux concentrate comprising a water solution of zinc chloride, sal-ammoniac, an ester-type non-ionic surfactant and a quaternary ammonium salt.

Other objects and advantages of the invention will become more apparent as the description now proceeds.

As is known, the sequence of steps in the galvanizing of ferrous materials is pickling in a sulfuric or hydrochloric acid bath, rinsing, fluxing in a pre-dip tank containing a solution of zinc ammonium chloride or other known fluxes, followed by immersion in a molten zinc bath the surface of which may or may not be protected by molten sal-ammoniac flux or other compounds in the form of a continuous blanket upon the molten zinc. The pre-dip flux tank provides a solder base effecting a superior bond between the zinc and the iron base. It is conventional that the pre-dip flux be in the form of a water solution of zinc ammonium chloride or related compounds, and it has been found that when a workpiece treated with this solution is introduced through a sal-ammoniac flux blanket into the molten zinc, a spattering of the molten zinc occurs creating hazardous conditions in the galvanizing room and frequently causing serious burns to the workmen. This is of course in addition to the other disadvantages connected with present pre-dip flux solutions of the constant irritation from strong ammonia fumes issuing from the galvanizing kettle, the difficulty in handling and mixing zinc ammonium chloride into a solution of the desired specific gravity, and the difficulty of obtaining a galvanized coating which has the desired smoothness, brightness and uniformity.

Applicant has discovered, however, that these problems may be overcome by provision of a flux concentrate for use in the pre-dip flux tank, the concentrate preferably comprising zinc chloride, sal-ammoniac, an ester-type non-ionic surface active agent, a quaternary ammonium salt, and water in sufficient quantity to dissolve the named materials and produce a volume of concentrate which may be readily shipped and handled in a 30 or 55 gallon drum or other desired container. While variations may of course be practiced in the formulation, flux concentrate for shipment in a 30 gallon drum may be compounded by combining 2.6 gallons each of surfactant and quaternary ammonium salt, 31.5 pounds each of zinc chloride and sal-ammoniac, and water to make a total of 30 gallons. This concentrate may then be diluted with water in the ratio of 10 parts water to 1 part concentrate for use in the pre-dip flux tank.

The ester-type non-ionic surface active agent may be provided by various compounds, and the preferred class of compounds are ethylene oxide derivatives of fatty acids, fatty amines and fatty amides. A specific compound which has proven well in practice is identified by its manufacturer Armour & Company as Ethofat 242–25, the Ethofats generally being understood to be mono-fatty or rosin acid esters of polyoxyethylene glycols and to have the following general formula:

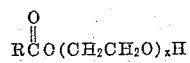

The source of the alkyl radical in Ethofat 242-25 is understood to be 70% rosin fatty acids, and this compound has an average molecular weight of 974, and a specific gravity (25°/25° C.) of 1.081. Another etho-chemical which produces satisfactory results in the present invention is identified by Armour & Company as Ethofat O/25, and the source of the alkyl radical in the compound is coco fatty acids. The average molecular weight of Ethofat O/25 is understood to be 871, and the specific gravity thereof is approximately 1.059. Ethofat O/25 has the type of linkage indicated above. While particularly good results have been obtained by use of the Ethofat compounds herein mentioned, it is to be appreciated that under particular conditions it may be found desirable to employ certain of the other etho-chemicals. Such compounds which may be used in substitution for the Ethofats are surfactants identified by Armour & Company as Ethomeens and Ethomids. The Ethomeens are understood to be tertiary amines having one fatty alkyl group (derived from various fatty sources having from 12 to 18 carbon atoms) and two polyoxyethylene groups attached to the nitrogen, while the Ethomids are understood to be N,N-substituted fatty acid amides, the substituents being polyoxyethylene groups.

The quaternary ammonium salt used in the formulation set forth above may similarly be provided by various compounds known to the trade, and in investigations conducted to date a material identified by Armour & Company as Arquad 2C-50 has proven quite satisfactory. The Arquad compounds are broadly dialkyl quaternary ammonium chlorides, and more specifically dialkyl dimethyl ammonium chlorides. The general formula of these compounds is as follows:

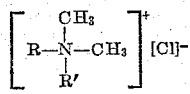

In the formula above, each R and R' represents a long hydrocarbon chain derived from a fatty acid. Arquad 2C-50 is a semi-liquid at room temperature and is essentially insoluble in water. It does, however, form a stable dispersion in water in the concentrations herein employed, and is of course compatible with the ester-type non-ionic surface active agent disclosed.

The flux concentrate formulation noted above may be observed to contain equal quantities of ester-type non-ionic surface active agent and quaternary ammonium salt, as well as equal weights of zinc chloride and sal-ammoniac. It is of course to be appreciated that equal parts of these materials are not at all times required, and that the ratio of non-ionic surfactant to quaternary ammonium salt may be either 3:2 or 2:3, and that the same ratios may be applied to the zinc chloride and sal-ammoniac.

While the exemplary formulation described above contains four constituents in water, modifications may be made thereto by the addition of glucose and glycerine. As for example, an additive composition may first be formulated from about 4½ gallons each of Ethofat 242-25 and Arquad 2C-50 combined with 2 gallons each of Argo corn syrup and glycerine. This produces 13 gallons of material and there can be added thereto 42 gallons of water to produce a quantity of additive conveniently shipped in a 55-gallon drum. To provide a flux concentrate, 4 gallons of the described additive may be mixed with about 220 pounds of zinc chloride crystals and 50 pounds of sal-ammoniac crystals, the result of this mixture being then diluted with water to make a 55 gallon total. The second formulation just described has a Baumé gravity of 37-38° at 60° F., and the concentrate may then be diluted with water for use in a pre-dip flux tank by diluting one part of concentrate with eight parts of water. The working flux solution as thus produced and when in diluted and fresh form has a Baumé gravity of approximately 5.2 to 5.5°.

A floor concentrate as compounded in accordance with either the first or second formulation above disclosed, or by suitable variations therein, essentially completely eliminates spattering of molten zinc from the galvanizing bath when the workpiece is charged into the kettle through the sal-ammoniac flux covering the molten zinc. A pre-dip flux tank containing either of these formulations may be operated at either room temperature or heated, and whether the workpiece is wet or dry when introduced into the zinc bath through the sal-ammoniac blanket floating on top of the molten zinc, there is what may be considered complete elimination of spatter. This, as is known, has been the cause of about 99% of the burn injuries during galvanizing. Also, by proceeding in accordance with the present concepts, there is obtained a marked improvement in the uniformity of the various zinc-iron alloy layers and the pure zinc layer in the structure of the galvanized coating. Dry zinc ashes and zinc oxide on the surface of the kettle are substantially reduced by reason of cleaner fluxing procedures, and for the same reason there is a reduction of the order of 16% in the amount of dross formed. The strong ammonium fumes issuing from the galvanizing kettle are markedly suppressed if not completely eliminated, and there is further improved adhesion of the galvanized coating to the ferrous base. As compared with the use of standard zinc ammonium chloride fluxing pre-dip solution, the material's cost is reduced herein from about 20 to 33⅓%. In addition, since the flux formulation herein disclosed is shipped as a liquid concentrate, a 650 pound drum of the concentrate can be readily diluted with water to provide 495 gallons of working flux at 5.5 Baumé, as contrasted with the necessity of using about 1633 pounds of zinc ammonium chloride to make up the same volume of working flux at 18° Baumé. The use of a liquid eliminates the problem of torn bags, and further, the present liquid concentrate when diluted is instantly at the proper Baumé, whereas by the prior art technique using crystalline material there is required from 12 to 36 hours before the zinc ammonium chloride salt solution reaches the operating gravity of 18° Baumé. And even further, the present flux when diluted has a pH of 5.5 and is thus essentially neutral, whereas zinc ammonium chloride in the proper solution has a pH of about 3.1. There is thus no harmful burning or smarting effects on the human skin and the flux does not burn into the skin if allowed to dry thereon.

As was also noted in the introductory paragraphs to the present specification, a molten sal-ammoniac or zinc ammonium chloride flux blanket upon the molten zinc galvanizing bath may be maintained in a relatively thin and active condition or rejuvenated by applying thereto either diluted flux concentrate or a water mixture of an ester-type non-ionic surfactant and a quaternary ammonium salt. If a flux concentrate in accordance with the second formulation herein disclosed is used, this concentrate may be diluted 3 to 1 with water and provides an excellent wetting medium, or the non-ionic surface active agent and quaternary ammonium salt may be mixed in about equal proportions and diluted up to about 10 to 1 with water. The revitalizing solution may be applied to the flux blanket in various ways, and a preferred technique is to spray the same over the surface of the flux. Only a relatively small quantity of revitalizing fluid is required, and as for example a flux blanket measuring 44″ wide by 10 ft. long can be reactivated with less than a quart of the diluted mixture.

The method of treating a flux blanket by applying thereto either diluted flux concentrate or a diluted mixture of non-ionic surface active agent and quaternary ammonium salt has the important advantage of essentially entirely eliminating smoking of the galvanizing bath and the presence of ammonium vapors in the steam issuing therefrom. The presence of ammonia fumes in the galvanizing room is frequently a cause of nausea on the part of the workers, and when the flux blanket is reactivated as herein disclosed the necessity of frequently rejuvenating the flux blanket by adding thereto new flux material is eliminated. Accordingly, the amount of ammonia bearing salts required is reduced markedly, and by at all times maintaining the flux in an active condition, a brighter, cleaner and more uniform galvanized coating is obtained, primarily for the reason that the molten flux does not stick to the surface to be galvanized and excess immersion time in the molten zinc is not required in order to remove the flux deposit.

While specific surface active agents have been set forth herein by way of example, and illustrative formulations provided, it will of course be appreciated that various changes and modifications may be made therein without departing from the novel concepts of the present invention.

I claim as my invention:

1. A flux composition for use in galvanizing, which consists essentially of a mixture of two to three gallons each of a non-ionic surfactant in the form of a rosin acid ester of polyoxyethylene glycol and a cationic surface active agent in the form of dialkyl dimethyl-ammonium chloride, 25 to 35 pounds each of zinc chloride and sal ammoniac, and water sufficient to make a total of 30 gallons.

2. A flux for use in a pre-dip flux tank in galvanizing operations, which comprises the mixture of claim 1 diluted with between about 8 to 12 parts of water to each part of mixture.

3. A flux composition for use in galvanizing, which consists essentially of a mixture of from three to five gallons of an additive comprised of 3.5 to 5.5 gallons each of a non-ionic surfactant in the form of a rosin acid ester of polyoxyethylene glycol and a cationic surface active agent in the form of dialkyl dimethylammonium chloride, ¾ to 4 gallons each of glucose and glycerine and water sufficient to make 55 gallons of additive, 200 to 250 pounds of zinc chloride, 25 to 75 pounds of sal ammoniac, and water sufficient to make 55 gallons of mixture.

4. A flux for use in a pre-dip flux tank in galvanizing operations, which comprises the mixture of claim 3 diluted with between about 6 to 10 parts of water to each part of mixture.

5. A method of treating a molten flux blanket of melted sal-ammoniac upon a molten zinc bath to suppress the fuming thereof, which includes the step of applying to the blanket an aqueous mixture of a non-ionic surfactant in the form of a long hydrocarbon chain rosin acid ester of polyoxyethylene glycol and a cationic surface active agent in the form of a long hydrocarbon chain dialkyl dimethylammonium chloride, the ratio of non-ionic surfactant to cationic surface active agent being from 3:2 to 2:3.

6. A method of treating a molten flux blanket of melted sal-ammoniac upon a molten zinc bath to suppress the fuming thereof, which includes the step of applying to the blanket an aqueous mixture of a chloride fluxing agent selected from the group consisting of ammonium chloride, zinc chloride and zinc ammonium chloride; a non-ionic surfactant in the form of an ethylene oxide derivative of a compound selected from the group consisting of long hydrocarbon chain fatty acids, long hydrocarbon chain fatty amines and long hydrocarbon chain fatty amides; and a cationic surface active agent in the form of a quaternary ammonium salt which is a long hydrocarbon chain fatty acid derivative; the chloride fluxing agent, non-ionic surfactant and cationic surface active agent being present in such amounts that when mixed in water and applied to a galvanizing bath the aqueous mixture essentially entirely eliminates smoking of the bath and the issuance of substantial quantities of ammonia fumes therefrom.

References Cited in the file of this patent

UNITED STATES PATENTS

| | | |
|---|---|---|
| 1,965,760 | Baldwin | July 10, 1934 |
| 2,548,690 | Vieno | Apr. 10, 1951 |

FOREIGN PATENTS

| | | |
|---|---|---|
| 711,012 | Great Britain | June 23, 1954 |